US009823057B1

(12) United States Patent
Dixon

(10) Patent No.: US 9,823,057 B1
(45) Date of Patent: Nov. 21, 2017

(54) MOTORCYCLE STARTER CONTACT ALIGNMENT TOOL

(71) Applicant: James W. Dixon, Samborn, NY (US)

(72) Inventor: James W. Dixon, Samborn, NY (US)

( * ) Notice: Subject to any disclaimer, the term of this patent is extended or adjusted under 35 U.S.C. 154(b) by 203 days.

(21) Appl. No.: 14/989,941

(22) Filed: Jan. 7, 2016

Related U.S. Application Data

(60) Provisional application No. 62/101,532, filed on Jan. 9, 2015.

(51) Int. Cl.
*G01B 5/25* (2006.01)
*B25B 27/00* (2006.01)

(52) U.S. Cl.
CPC ............ *G01B 5/25* (2013.01); *B25B 27/0035* (2013.01)

(58) Field of Classification Search
CPC .............. G01B 2210/18; G01B 11/275; G01B 2210/30; G01B 2210/283; G01B 5/255; G01B 2210/306
USPC .................................................... 33/533, 645
See application file for complete search history.

(56) References Cited

U.S. PATENT DOCUMENTS

| | | | | |
|---|---|---|---|---|
| 2,492,576 | A | 12/1949 | James | |
| 3,150,698 | A | 9/1964 | Neil | |
| 4,072,070 | A | 2/1978 | Finn | |
| 4,206,663 | A | 6/1980 | Pace | |
| 5,887,492 | A | 3/1999 | De Lancy | |
| 6,240,648 | B1 * | 6/2001 | Dolph .................. | B62K 25/283 33/203.18 |
| 6,796,205 | B2 | 9/2004 | Wickes et al. | |
| 6,904,836 | B1 | 6/2005 | Andrei | |
| 2003/0182814 | A1 * | 10/2003 | Duke ..................... | G01B 5/255 33/203 |
| 2008/0295346 | A1 * | 12/2008 | Tanga ...................... | G01B 3/28 33/337 |
| 2012/0110867 | A1 * | 5/2012 | Molina .................. | G01B 3/205 33/608 |

* cited by examiner

*Primary Examiner* — Yaritza Guadalupe-McCall
(74) *Attorney, Agent, or Firm* — Robert C. Montgomery; Montgomery Patent & Design LP.

(57) ABSTRACT

A motorcycle starter contact alignment tool is configured to be an adaptation of a solenoid tool plate incorporating a threaded aperture to adjustably control the advancement of a threaded rod and a contact jig. The threaded rod is intended to depress the contact jig, having an alignment face which coincidentally contacts a pair of electrical contacts within the solenoid housing, so as to properly align those contacts prior to being tightened in position. The threaded rod is provided with a handle to facilitate the turning thereof.

18 Claims, 3 Drawing Sheets

MOTORCYCLE STARTER CONTACT ALIGNMENT TOOL

RELATED APPLICATIONS

The present invention was first described in and claims the benefit of U.S. Provisional Application No. 62/101,532 filed Jan. 9, 2015, the entire disclosures of which are incorporated herein by reference.

FIELD OF THE INVENTION

The present invention relates generally to a starter contact alignment tool specifically for use with a motorcycle.

BACKGROUND OF THE INVENTION

As anyone who performs a great deal of mechanical work will attest, nothing beats having the proper tool for a job. The proper tool can save time, save money, produce a higher quality job, reduce damage to equipment, and provide for the increased safety of the worker. Each field of mechanical work has its own type of specialty tools, each performing a specialized task.

One (1) field where there has been a need for such a specialized tool is that of the installation of electrical contacts on starters used on motorcycles. A typical repair sequence involves the user trying to balance the contacts with one's thumb with one (1) hand while trying to tighten them in place with the other. This not only results in pain and discomfort for the user, but causes the contacts to be installed at an angle resulting in premature failure. Accordingly, there exists a need for a means by which motorcycle starter contacts can be easily installed without the disadvantages as described above. The use of the alignment tool assists in the installation of motorcycle contact starters in a manner which is quick, easy, and effective.

SUMMARY OF THE INVENTION

The inventor has recognized the aforementioned inherent problems and lack in the art and observed that there is a need for a starter contact alignment tool specifically for use with a motorcycle.

It is therefore the purpose of the inventor to provide an alignment tool system comprising a tool plate which is capable of being attached to a housing of a motorcycle starter solenoid, a rod which is capable of being inserted through an aperture of the tool plate and having a cylindrical handle affixed perpendicularly to a first end of the rod and a contact jig comprising a jig body and a thrust body capable of mechanical communication with the rod when the rod is inserted through the tool plate aperture. The contact jig, when it is inserted into the solenoid, aligns the internal electrical contacts of the solenoid. This occurs when the thrust body of the jig is in mechanical communication with the rod as the rod passes through the tool plate aperture. The tool plate should be attached to the housing during this process.

The tool plate may also comprise of a centrally positioned cone which is oriented to project outwardly and away from the solenoid when the plate is attached to the solenoid. The tool plate may also have a nut with an internal thread attached to an exterior side of the cone and a plurality of threaded apertures.

The rod may also comprise a plurality of threads across at least a majority of an exterior surface. The cone may also be adapted to provide an internal clearance for the thrust body of the contact jig when inserted within the housing. The tool plate may be made of forged metal or a rigid thermoplastic. The cone may be adapted to provide internal clearance for the first end of a solenoid cartridge when the cartridge is in an inactive position. The second end of the rod may also be capable of being threadingly attached to the tool plate. The contact jig may be made of either wood or metal.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
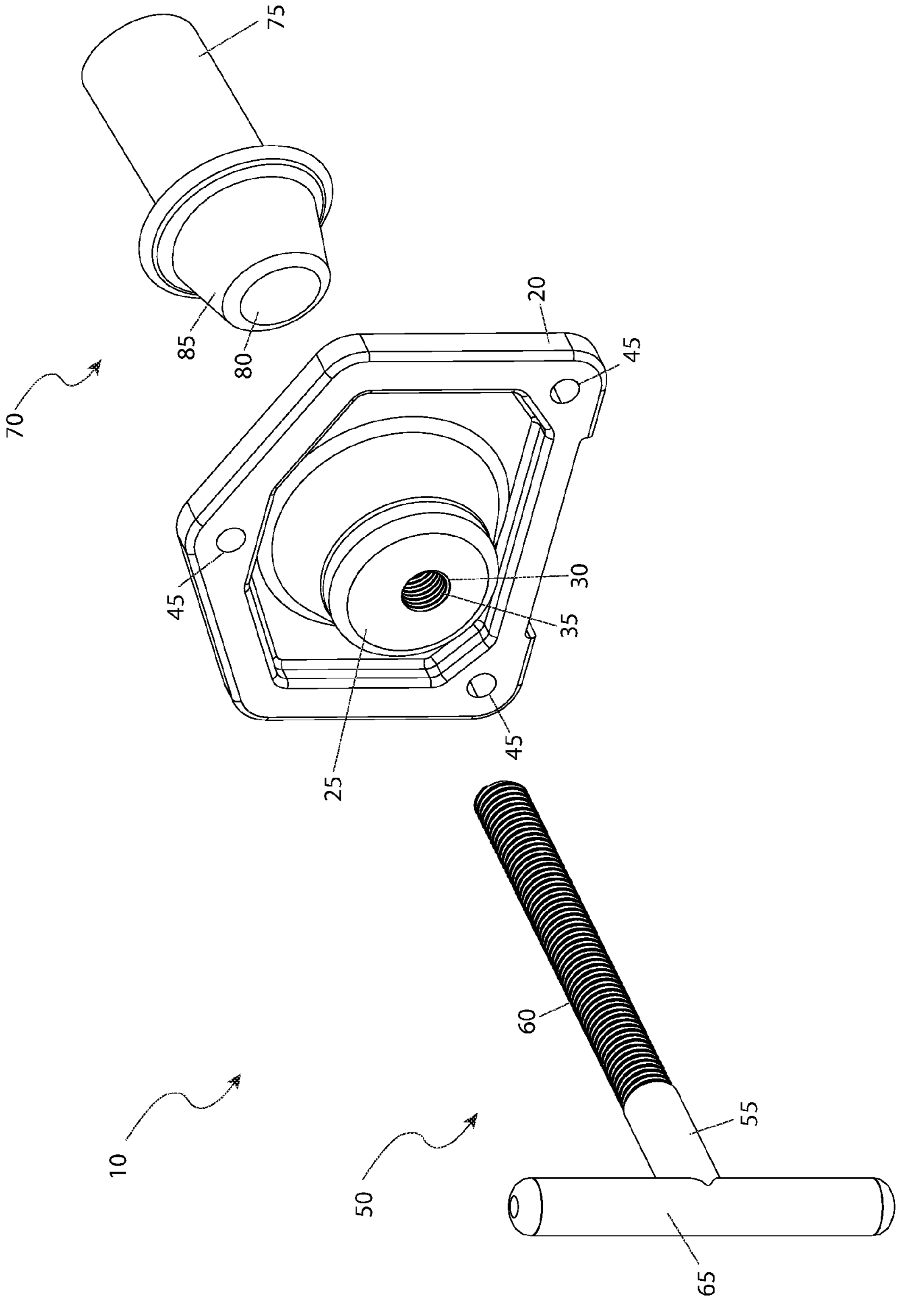
FIG. 1 is an exploded view of a motorcycle starter contact alignment tool 10 in accordance with the preferred embodiment of the present invention.

10 tool
20 tool plate
25 cone
30 threaded aperture
35 internal thread
40 finished face
45 fastener aperture
50 threaded rod
55 shaft
60 external thread
65 handle
70 contact jig
75 jig body
80 thrust face
85 thrust body
90 alignment face
100 starter
105 solenoid
110 solenoid housing
115 tool plate fastener
118 contact aperture
120 battery contact
125 motor contact
130 contact fastener
135 insulator
140 retaining nut
145 coil
170 return spring

DETAILED DESCRIPTION OF THE PREFERRED EMBODIMENT

Figure 2:
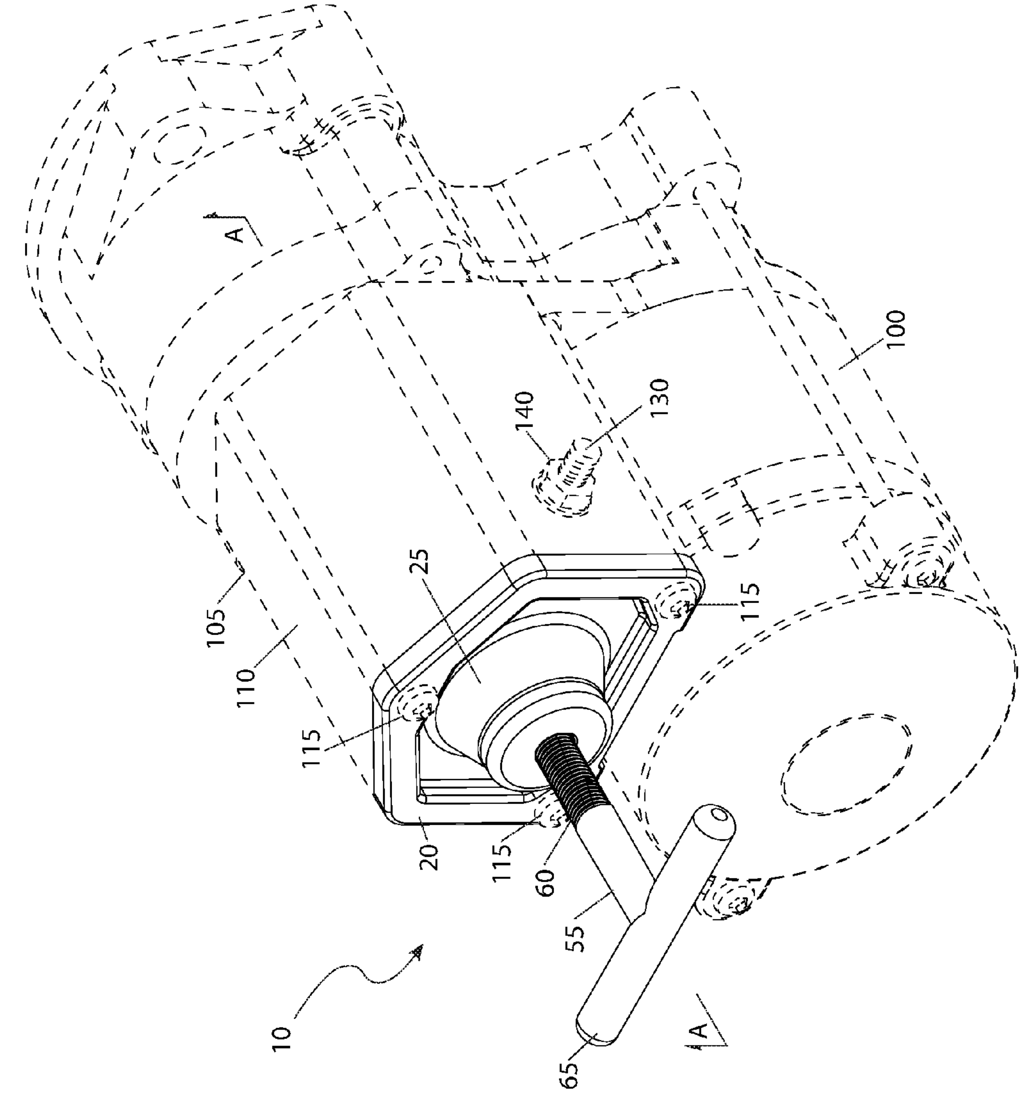
FIG. 2 is an isometric view of the tool 10 in use on a starter 100 in accordance with the preferred embodiment of the present invention; and, FIG. 3 is a section view along line A-A as seen in FIG. 2 cut through a solenoid portion 105 of the starter 100 and the tool 10 in accordance with the preferred embodiment of the present invention.
Figure 3:
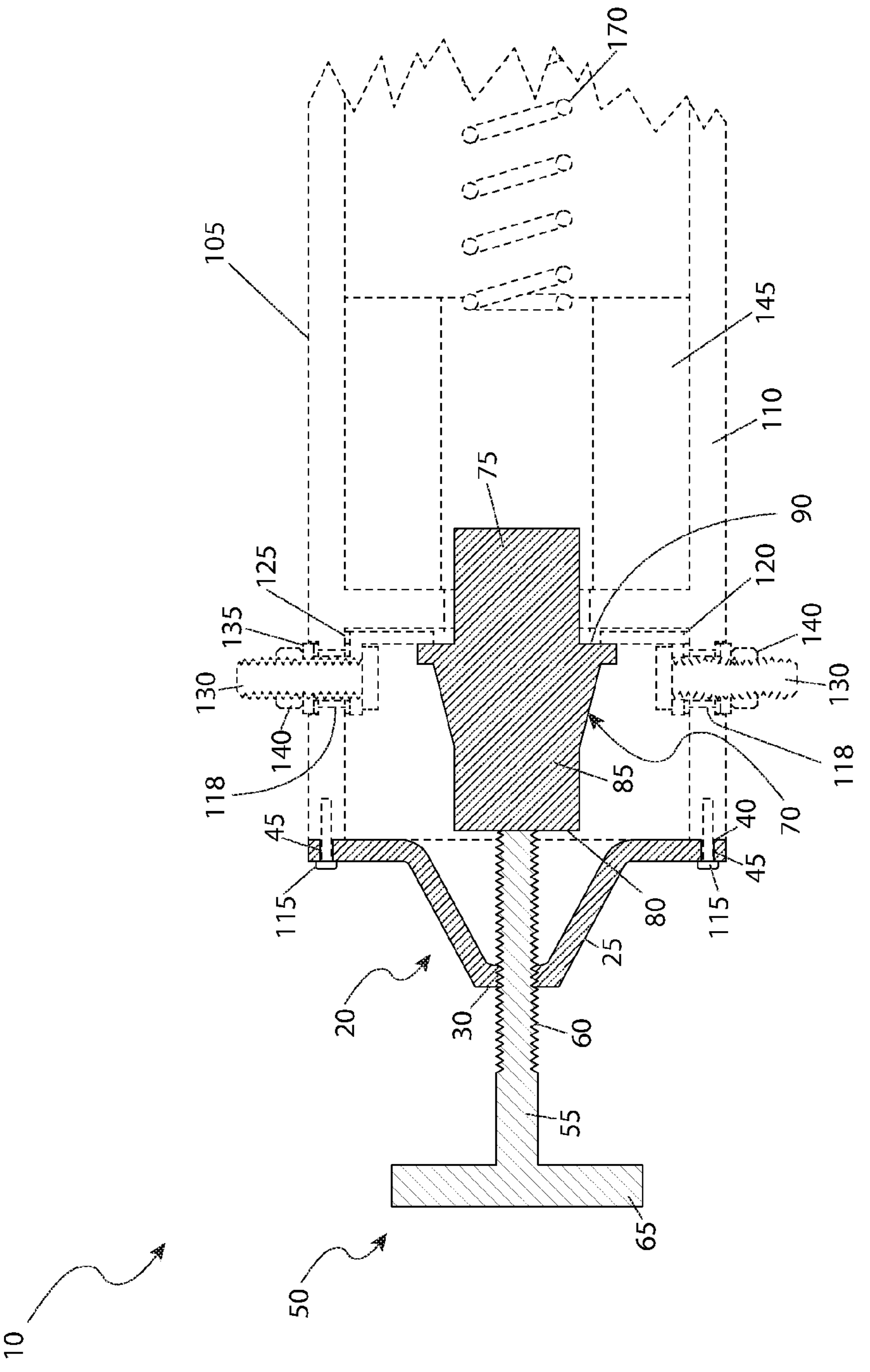

The best mode for carrying out the invention is presented in terms of its preferred embodiment, herein depicted within FIG. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms “a” and “an” herein do not denote a limitation of quantity, but rather denote the presence of at least one of the referenced items.

The present invention describes a motorcycle starter contact alignment tool (herein referred to as the “tool”) 10, which provides a means to repair an existing starter 100 via installation of purchased replacement parts using the tool 10. The tool 10 enables simultaneous alignment of internal electrical contact portions 120, 125, into the motorcycle starter 100 by utilizing contact with an alignment face portion 90 of a contact jig 70. The contacts 120, 125 are then subsequently tightened in position, thereby obviating any loss of electrical conduction, or performance of the electromotive starter 100.

Referring now to FIGS. 1, 2, and 3, exploded, isometric, and sectional views of the tool 10, according to the preferred embodiment of the present invention, are disclosed. The tool 10 includes a tool plate 20 and a threaded rod 50. The tool plate 20 is an emulation of an original solenoid tool plate (not shown) having an additional provision for a threaded aperture 30 machined through a cone portion 25. During functional use of the starter 100, the cone 25 provides internal clearance for a first end of a solenoid cartridge (not shown) while in an inactive, or neutral, position. The cone portion 25 of the tool plate 20 provides a similar internal clearance for a thrust body portion 85 of a contact jig 70 which is to be inserted within the solenoid housing 110 to accomplish the contact-alignment purpose of the tool 10. Due to this particular alignment between the cone 25 and the thrust body 85, the placement of the threaded aperture 30 at this location provides the most appropriate vantage point to accomplish the displacement of the contact jig 70 within the solenoid housing 110. The tool plate 20 may be a metal casting, a forging, or a stamped metal piece having the appropriate features. It is understood that other materials, such as a rigid thermoplastic, or a composite material, may be utilized without limiting the scope of the tool 10. The threaded aperture 30 may be formed solely into the material of the cone 25, or additional material or a threaded nut fastener, may be incorporated into the cone 25 in order to support additional screw thread portions of the internal thread 35. The tool plate 20 is intended to be attached to the solenoid housing 110 in place of the original solenoid tool plate (not shown) to accomplish the intended function. Accordingly, it is envisioned that a finished face 40 of the tool plate 20, located on an opposite side from the cone 25, would have a characteristic flatness, within a certain tolerance limit, to maintain a precise alignment of the centerline of the threaded aperture 30 with the solenoid cartridge 150 (see FIG. 3).

A plurality of fastener apertures 45 are disposed along a peripheral edge of the tool plate 20 in a correspondingly matching pattern with the tool plate fasteners 115 utilized in the solenoid housing 110. It is envisioned that, in some embodiments, additional fastener apertures 45 may be disposed in the tool plate 20 to broaden the use of the tool 10 to various models of solenoid housings 110.

The threaded rod 50 is configured to be a cylindrical metal shaft 55 having a perpendicularly extending cylindrical handle 65 at a first end giving the threaded rod 50 a “T”-shape. The shaft 55 is provided with an external thread 60 along at least a majority of its length, complimentary to the internal thread 35 of the threaded aperture 30. A second end of the shaft 55 is inserted through the threaded aperture 30 of the cone 25. It is understood that other materials, such as a rigid thermoplastic, may be utilized for the threaded rod 50 without limiting the scope of the tool 10. The handle 65 may also be configured to be more elaborate than a single cylindrical rod so long as the user has a means to grasp and turn the threaded rod 50 to accomplish the function of the tool 10.

The contact jig 70 is configured to be a surrogate for a solenoid cartridge, utilized solely for the purpose of properly aligning the contacts 120, 125 with an alignment face portion 90 of the contact jig 70 so as to be positioned correctly for use following a tightening procedure. The contact jig 70 includes a generally cylindrical jig body 75 having an appropriate outside diameter and length to fit within the solenoid housing 110 and extend partially within the coil 145. The opposite end of the contact jig 70 from the jig body 75 is a thrust body 85. The thrust body 85 is configured to be conical in shape, increasing in diameter along the longitudinal axis from a thrust face 80 at a first end to an alignment face 90 at the junction of the jig body 75. The thrust face 80 is the point of contact for the second end of the threaded rod 50 when the threaded rod 50 is fitted into the tool plate 20 during use. The alignment face 90 is configured to be of a sufficient outside diameter to bear across both the battery contact 120 and motor contact 125 portions and maintain the correct positioning thereof during the procedure to align and tighten the contacts 120, 125. The flatness of the alignment face 90 must be controlled to match the original contact plate (not shown) of a new replacement solenoid cartridge. The contact jig 70 is composed of a thermoplastic material and formed in an injection-molding process. It is understood that other materials, such as any variety of wood, or metal, may be utilized without limiting the scope of the tool 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the tool 10, it would be installed as indicated in FIG. 2. The ensuing procedure may not completely describe every situation which may be encountered and certain procedural steps may be performed in an alternate order and should not be viewed as a limiting factor.

The method of installing a replacement package utilizing the tool 10 may be achieved by performing the following steps: procuring the tool 10; procuring a specific parts replacement package for the intended starter 100; removing the starter 100 from the motorcycle; removing the existing solenoid tool (not shown) by removing the tool plate fasteners 115 to expose the existing solenoid cartridge (not shown) and contacts 120, 125; removing the existing solenoid cartridge; removing the used battery contact 120 and motor contact 125 portions by loosening and removing the two (2) external retaining nuts 140; removing the respective insulators 135, disposed upon the contact fasteners 130; retaining the insulators 135 for subsequent reuse; motioning the contact fasteners 130 and their respective battery 120 and motor 125 contacts into the solenoid housing 110; removing the contact fasteners 130 and used contacts 120,

125; discarding the used battery 120 and motor 125 contacts; retaining the retaining nuts 140 and contact fasteners 130 for subsequent reuse; inserting the contact fasteners 130 into the new battery contact 120 and new motor contact 125 portions; placing the insulators 135 onto the contact fasteners 130; installing the contact fasteners 130 together with their respective new contacts 120, 125 through the contact apertures 118 from the interior side of the solenoid housing 110; installing the retaining nuts 140 loosely upon the contact fasteners 130; inserting the contact jig 70 into the solenoid housing 110 with the jig body 75 positioned within the coil 145 and the alignment face portion 90 of the contact jig 70 touching the contacts 120, 125; installing the tool plate 20 onto the solenoid housing 110 using the tool plate fasteners 115; installing the external threaded portion 60 of the threaded rod 50 into the threaded aperture 30 until the end of the external threaded portion 60 makes contact with the thrust face 80; and, rotating the "T" handle 65 until the alignment face 90 until rotation of the handle 60 meets with significant resistance, indicating that the alignment face 90 is in contact with both the battery contact 120 and the motor contact 125; tightening the retaining nuts 140 upon the contact fasteners 130 to the proper torque; removing the tool plate 20 and contact jig 70 from the solenoid housing 110; applying a thin coating of dielectric grease to outer surface portions of a new replacement solenoid cartridge (not shown); inserting the replacement solenoid cartridge into the coil 145; and, re-installing the original solenoid tool onto the solenoid housing 110.

This juxtaposition of the contacts 120, 125 with the alignment face 90 assures that the contacts 120, 125 are aligned correctly and equidistant from the contact plate 160. Following the replacement and proper alignment of the contacts 120, 125, the starter 100 may be reinstalled upon the motorcycle.

A description of the normal functioning of the starter upon a motorcycle is as follows: As the solenoid 105 of the starter 100 is energized by the motorcycle ignition, the solenoid cartridge is drawn into the magnetic field of the coil 145, thereby placing a pinion gear into a tooth mesh engagement with a ring gear located normally on an output shaft of the internal combustion engine to which it is affixed. Simultaneously, a contact plate, attached as a portion of the solenoid cartridge, is placed in touch with a battery contact 120 and a motor contact 125 in the solenoid housing 110 so as to form an electrical union to transmit an electromotive force between the contacts 120, 125 to rotate the starter 100 to start the engine. During the course of use, the contacts 120, 125 as well as the contact plate may become pitted by electrical arcing, ultimately resulting in a failure to transmit the electromotive force from the battery contact 120, through the contact plate, to the motor contact 125 to start the engine. If this occurs, it will become necessary to replace the defective parts.

A new set of contacts 120, 125 and a new solenoid cartridge, having a new contact plate, can be acquired as a parts replacement package to correct the failure. In order to accomplish the repair, a series of steps must be executed to bring about the replacement of the contacts 120, 125 and the solenoid cartridge.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An alignment tool system, comprising:
- a tool plate capable of being attached to a housing of a motorcycle starter solenoid;
- a rod capable of insertion through an aperture of said tool plate, further having a cylindrical handle affixed perpendicularly to a first end thereof; and,
- a contact jig comprising a jig body and a thrust body capable of mechanical communication with said rod when said rod is inserted through said tool plate aperture;
- wherein said contact jig, when inserted into said solenoid, aligns internal electrical contacts of said solenoid when said thrust body is in mechanical communication with said rod passing through said tool plate aperture when said tool plate is attached to said housing.

2. The system of claim 1, wherein said tool plate further comprises a centrally positioned cone, oriented to project outwardly and away from said solenoid when said plate is attached to said solenoid.

3. The system of claim 2, wherein said tool plate further comprises a nut having an internal thread attached to an exterior of said cone.

4. The system of claim 2, wherein said cone is adapted to provide an internal clearance for said thrust body of said contact jig when inserted within said housing.

5. The system of claim 2, wherein said cone is adapted to provide internal clearance for a first end of a solenoid cartridge while in an inactive position.

6. The system of claim 1, wherein said tool plate further comprises a plurality of threaded apertures.

7. The system of claim 1, wherein said rod further comprises a plurality of threads across at least a majority of an exterior surface.

8. The system of claim 1, wherein the tool plate made is made of forged metal.

9. The system of claim 1, wherein the tool plate is made of rigid thermoplastic.

10. The system of claim 1, wherein a second end of said rod is capable of being threadingly attached to said tool plate.

11. An alignment tool system, comprising:
- a tool plate capable of being attached to a housing of a motorcycle starter solenoid, further comprising a centrally positioned cone orientated to project outwardly and away from said solenoid when said tool plate is attached thereto;
- a rod capable of insertion through said tool plate, further having a cylindrical handle affixed perpendicularly to a first end thereof; and,
- a contact jig comprising a jig body and a thrust body capable of mechanical communication with said rod when said rod is inserted through said tool plate;
- wherein a second end of said rod is capable of being threadingly attached to said tool plate;
- wherein said cone is adapted to provide internal clearance for a first end of a solenoid cartridge while in an inactive position;
- wherein said cone is adapted to provide an internal clearance for said thrust body of said contact jig when inserted within said housing; and,
- wherein said contact jig, when inserted into said solenoid, aligns internal electrical contacts of said solenoid when said thrust body is in mechanical communication with said rod passing through said tool plate aperture when said tool plate is attached to said housing.

12. The system of claim 11, wherein said tool plate further comprises a nut having an internal thread attached to an exterior of said cone.

13. The system of claim 11, wherein said tool plate further comprises a plurality of threaded apertures.

14. The system of claim 11, wherein said rod further comprises a plurality of threads across at least a majority of an exterior surface.

15. The system of claim 11, wherein the tool plate made is made of forged metal.

16. The system of claim 11, wherein the tool plate is made of rigid thermoplastic.

17. The system of claim 11, wherein said contact jig is made of wood.

18. The system of claim 11, wherein said contact jig is made of metal.

* * * * *